United States Patent
Beyer et al.

(10) Patent No.: US 6,514,915 B1
(45) Date of Patent: Feb. 4, 2003

(54) SYNTHETIC BASE FLUID FOR ENHANCING THE RESULTS OF CRUDE OIL CHARACTERIZATION ANALYSES

(75) Inventors: Timothy Martin Beyer, Houston, TX (US); Steven Kyle Watson, Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 75 days.

(21) Appl. No.: 09/675,703

(22) Filed: Sep. 29, 2000

Related U.S. Application Data

(60) Provisional application No. 60/156,645, filed on Sep. 29, 1999.

(51) Int. Cl.[7] .................................................. C09K 7/06
(52) U.S. Cl. ....................... 507/103; 507/203; 507/905
(58) Field of Search ................................ 507/103, 203, 507/905

(56) References Cited

U.S. PATENT DOCUMENTS

| | | |
|---|---|---|
| 3,391,291 A | 7/1968 | Benson et al. |
| 3,482,000 A | 12/1969 | Fernald et al. |
| 3,663,647 A | 5/1972 | Lanier |
| 3,676,523 A | 7/1972 | Mason |
| 3,689,584 A | 9/1972 | Kobetz |
| 5,189,012 A | 2/1993 | Patel et al. |
| 5,589,442 A | 12/1996 | Gee et al. |
| 5,605,879 A | 2/1997 | Halliday et al. |
| 5,627,143 A | 5/1997 | Sawdon |
| 5,741,759 A | 4/1998 | Gee et al. |
| 5,851,958 A * | 12/1998 | Halliday et al. ............. 507/103 |
| 5,869,434 A * | 2/1999 | Mueller et al. ............. 507/103 |
| 6,054,415 A | 4/2000 | Gee et al. |
| 6,057,272 A | 5/2000 | Gee et al. |
| 6,323,157 B1 * | 11/2001 | Carpenter et al. .......... 507/103 |

* cited by examiner

*Primary Examiner*—Philip Tucker
(74) *Attorney, Agent, or Firm*—Paula D. Morris & Associates, P.C.

(57) ABSTRACT

Blends of synthetic olefins for use as the continuous phase of fluids selected from the group consisting of drilling, drill-in, and completion fluids. The blends meet EPA discharge requirements while also permitting investigators to clearly discern the presence and quantity of biological markers in reservoir fluid samples—particularly pristane and phytane.

88 Claims, No Drawings

SYNTHETIC BASE FLUID FOR ENHANCING THE RESULTS OF CRUDE OIL CHARACTERIZATION ANALYSES

This application claims the benefit of provisional application No. 60/156,645 filed Sep. 29, 1999.

FIELD OF THE INVENTION

The invention relates to blends of synthetic olefins for use as the continuous phase of fluids selected from the group consisting of drilling, drill-in, and completion fluids. The blends meet EPA discharge requirements while also permitting investigators to clearly discern the presence and quantity of biological markers in reservoir fluid samples—particularly pristane and phytane.

BACKGROUND OF THE INVENTION

Synthetic drilling fluids are prepared using isomerized olefins and linear alpha olefins in many combinations. The variety of olefin blends that are available today is the result of efforts to provide an adequate supply of base fluid to a robust market. Another reason for the variety of available blends is the variation in supply of olefin products from olefin manufacturers based on differences in manufacturing processes.

Environmental regulations require synthetic drilling fluid systems to meet a given set of test protocols in order for the cuttings generated by these systems to be discharged into the environment. Current evidence suggests that linear alpha olefins—particularly those having fewer than 14 carbon atoms or less—contribute to aquatic toxicity. The same toxicity problem apparently does not exist for isomerized olefins having 14 (or more) carbon atoms.

In addition to toxicity issues, it is important for the synthetic base used in a drilling system not to interfere with the analysis of reservoir fluids from the drilling or production operation. Two compounds for which the reservoir fluids commonly are evaluated are pristane (2,6,10,14-tetramethylpentadecane; also known as norphytane) and phytane (2,6,10,14-tetramethylhexadecane). The presence of these two compounds in reservoir fluids has been widely studied, and their presence and ratio are benchmark indicators of the potential economic value of any crude oil to be found in the formation being drilled. It is important for a drilling system not to interfere with accurate analysis of these economic indicators.

Unfortunately, certain olefins or olefin blends interfere with an accurate analysis of pristane and phytane content in reservoir fluids, at least when the analytical tool used is gas chromatography (GC). Olefin-based drilling systems are needed that both meet environmental standards and do not interfere with an accurate analysis of the pristane and phytane content of reservoir fluids.

SUMMARY OF THE INVENTION

The present invention provides a drilling system comprising a continuous phase comprising a blend of olefins. The blend consists essentially of a first quantity of isomerized olefins having from about 14 to about 16 carbon atoms and a second quantity of linear alpha olefins having about 18 carbon atoms.

DETAILED DESCRIPTION OF THE INVENTION

The present invention provides a blend of olefins useful as the base fluid in a synthetic oil-base drilling system. The blend (1) does not interfere with the evaluation of the presence and quantity of pristane and phytane in reservoir fluids, and (2) meets environmental regulations for discharge while providing excellent drilling performance. The blend comprises a combination of (a) "isomerized olefins" (defined below), preferably an "IO blend" comprising $C_{14}/C_{16}$ isomerized olefins, and (b) $C_{18}$ "linear alpha olefins" (defined below).

Applicants discovered that $C_{18}$ "linear alpha olefins" do not interfere with the analysis of reservoir fluids using gas chromatography at a concentration of about 20 vol. % or less, preferably about 15 vol % or less. Pristane elutes in a region between the $C_{16}$ and $C_{18}$ olefin peaks with no overlap between the observed peaks. Phytane elutes in a region slightly upscale from the $C_{18}$ olefin peak, and does not overlap with the $C_{18}$ linear alpha olefin peak.

The results are somewhat different for "isomerized olefins." Isomerized olefins do not interfere with the peaks observed for pristane unless they include $C_{18}$ range isomerized olefins. The peak for the isomerized olefins containing 18 carbon atoms is broad enough to extend into the region of, and overlay the peak observed for phytane. This is in contrast to the $C_{18}$ linear alpha olefins, whose presence does not interfere with the peak observed for phytane.

In general usage, the term "isomerized olefins" refers to olefins that are produced by skeletally isomerizing linear alpha olefins into a series of isomers of the same carbon chain length but with differing double bond position, creating a broader fingerprint. As used herein, the term "isomerized olefins" is broader, and is defined to include olefins made by skeletal isomerization and by other processes. For example, linear alpha olefins (LAO's) may be formed by polymerizing ethylene—which generally is derived from the catalytic cracking of naptha—using known procedures. LAO's are then catalytically modified to create the isomerized olefins. Suitable procedures that may be adapted by persons of skill in the art to form the olefins of the present invention are described in UK Patent Application GB 2 166 782A and U.S. Pat. No. 5,741,759, both of which are incorporated herein by reference; and, Kirk-Othmer Encyclopedia of Chemical Technology (3d Ed. 1981), pp. 487–491, incorporated herein by reference. See also U.S. Patent Nos. 3,482,000; 3,391,291; 3,689,584; 3,663,647; 3,676,523; and, Hydrocarbon Process, 58(11) 128 (1979), referred to in the cited Kirk-Othmer text, and incorporated herein by reference. Preferred IO's and LAO's are commercially available from Chevron Phillips Chemical Company, and their composition and preparation are described in U.S. Pat. No. 3,482,000, incorporated herein by reference.

"Isomerized olefins" ("IO's"), as defined herein, have the following general formula:

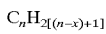

wherein n is from about 14 to about 16; x is the number of carbon-carbon double bonds; and, x is from about 1 to about n/2. In a preferred embodiment, the isomerized olefins comprise an "IO blend," defined herein as a blend in which a portion of the IO's have 14 carbon atoms and a portion of the IO's have 16 carbon atoms.

Suitable isomerized olefins also are represented by the following general formula:

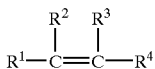

wherein, $R^1$ and $R^4$ independently are selected from the group consisting of straight chain alkyl, alkenyl, and polyalkenyl groups having from about 0 to about 14 carbon atoms, and branched alkyl, alkenyl, and polyalkenyl groups having from about 0 to about 14 carbon atoms, said branched alkyl, alkenyl, and polalkenyl groups further comprising from about 0 to about 2 substituents selected from the group consisting of alkyl and alkenyl groups having from about 1 to about 5 carbon atoms; and, $R^2$ and $R^3$ independently are selected from the group consisting of hydrogen, alkyl, and alkenyl groups having from about 1 to about 5 carbon atoms, provided that the total number of carbon atoms in said isomerized olefins is from about 14 to about 16. Preferred isomerized olefins are other than polyalphaolefins. Preferably, the isomerized olefins have a single unsaturated carbon-carbon bond located at a position other than the terminal or alpha-position, and have from about 0 to about 2 substituents selected from the group consisting of alkyl groups having from about 1 to about 2 carbon atoms.

The volume of $C_{14}$ isomerized olefin in the IO's preferably is limited because olefins having 14 or fewer carbon atoms may be more toxic than olefins with more carbon atoms. From a toxicity standpoint, it would be desirable for the "IO blend" to contain only $C_{16}$ IO's; however, commercial availability of pure $C_{16}$ IO becomes a limiting factor. IO's which contain some $C_{14}$ are more economically practical, and toxicity levels are adequate to meet environmental standards at contents of less than about 25 vol. % $C_{14}$. Therefore, the IO blend preferably contains from about 0 to about 24 vol. % $C_{14}$ IO's, more preferably from about 0 to about 20 vol. % $C_{14}$ IO's, most preferably from about 0 to about 15 vol. % $C_{14}$ IO's.

In a preferred embodiment, the base fluid contains IO's that are blended with "linear alpha olefins," or "LAO's" having 18 carbon atoms. "Linear alpha olefins" have a "double bond," or an unsaturated carbon-carbon bond at the terminal or alpha position of the carbon backbone, and preferably are linear. The preferred $C_{18}$ LAO used in the present blend has the following structure:

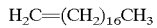

$H_2C=(CH_2)_{16}CH_3$

Although a fluid containing 100 vol. % $C_{14}$ and $C_{16}$ IO's and no LAO's should not interfere with the analysis of pristane and phytane levels, a fluid that contains $C_{18}$ LAO's is less toxic than a fluid containing 100 vol. % $C_{14}$ and $C_{16}$ IO's. Therefore, it is preferred to include as much $C_{18}$ LAO as possible in the blend in order to minimize the toxicity of the fluid. The IO's are blended with from about 0 vol. % to about 20 vol. % $C_{18}$ LAO's, preferably from about 10 to about 20 vol. %, and most preferably about 15 vol. % $C_{18}$ LAO's. The maximum amount of preferred LAO is defined as the maximum amount permitted in the isomerized olefin blends described in U.S. Pat. No. 5,741,759, incorporated herein by reference.

As a practical matter, the $C_{14}/C_{16}$ IO's and the $C_{18}$ LAO's will contain some impurities, typically as byproducts of the manufacturing process. The invention contemplates that these impurities will be present in the olefin blend, and the use of the phrase "consisting essentially of" to define the olefins used in the blend is not intended to exclude the presence of such impurities. Exemplary impurities include, but are not necessarily limited to the following: vinylidene, cis- and trans-2 tetradecene, and paraffin. Preferred $C_{14}/C_{16}$ IO's and the $C_{18}$ LAO's may include cis- and trans-2 octadecene as an impurity, but preferably in an amount that will maintain the total quantity of $C_{18}$ olefins at about 20 volume % or less, preferably about 15 volume % or less of the blend.

The blend of the present invention may be used as the base fluid for substantially any synthetic hydrocarbon base drilling fluid system, including but not necessarily limited to a drilling, drill-in, or completion fluid system. In a preferred embodiment, the drilling system is a drill-in system. Preferred commercially available systems are GEO-TEQ® or OMNI-FLOW®, both of which are commercially available from Baker Hughes INTEQ.

Persons of skill in the art will appreciate that many modifications may be made to the embodiments described herein without departing from the spirit of the present invention. Accordingly, the embodiments described herein are illustrative only and are not intended to limit the scope of the present invention.

We claim:

1. A drilling system comprising a continuous phase comprising a blend of olefins, said blend consisting essentially of a first quantity of isomerized olefins having from about 14 to about 16 carbon atoms and a second quantity of linear alpha olefins having about 18 carbon atoms.

2. The drilling system of claim 1 wherein said second quantity is about 20 volume % or less of said continuous phase.

3. The drilling system of claim 1 wherein said second quantity is about 15 volume % or less of said continuous phase.

4. The drilling system of claim 1 wherein said first quantity comprises up to about 20 vol. % of said isomerized olefins having about 14 carbon atoms.

5. The drilling system of claim 2 wherein said first quantity comprises up to about 20 vol. % of said isomerized olefins having about 14 carbon atoms.

6. The drilling system of claim 3 wherein said first quantity comprises up to about 20 vol. % of said isomerized olefins having about 14 carbon atoms.

7. The drilling system of claim 1 wherein said blend of olefins comprises a mixture of first isomerized olefins having 14 carbon atoms and second isomerized olefins having 16 carbon atoms.

8. The drilling system of claim 2 wherein said blend of olefins comprises a mixture of first isomerized olefins having 14 carbon atoms and second isomerized olefins having 16 carbon atoms.

9. A drilling system comprising a continuous phase consisting essentially of:
   a first quantity of an isomerized olefin blend comprising a mixture of first isomerized olefins having 14 carbon atoms and second isomerized olefins having 16 carbon atoms; and,
   a second quantity of linear alpha olefins having about 18 carbon atoms, said second quantity comprising up to about 15 volume % of said continuous phase.

10. The drilling system of claim 4 wherein said blend of olefins comprises a mixture of first isomerized olefins having 14 carbon atoms and second isomerized olefins having 16 carbon atoms.

11. The drilling system of claim 5 wherein said blend of olefins comprises a mixture of first isomerized olefins having 14 carbon atoms and second isomerized olefins having 16 carbon atoms.

12. The drilling system of claim 6 wherein said blend of olefins comprises a mixture of first isomerized olefins having 14 carbon atoms and second isomerized olefins having 16 carbon atoms.

13. The drilling system of claim 1 wherein said isomerized olefins consist essentially of a single unsaturated carbon-carbon bond, and have from about 0 to about 2 substituents selected from the group consisting of alkyl groups having from about 1 to about 2 carbon atoms.

14. The drilling system of claim 13 wherein said single unsaturated carbon-carbon bond is located at other than the alpha-position.

15. The drilling system of claim 2 wherein said isomerized olefins consist essentially of a single unsaturated carbon-carbon bond, and have from about 0 to about 2 substituents selected from the group consisting of alkyl groups having from about 1 to about 2 carbon atoms.

16. The drilling system of claim 15 wherein said single unsaturated carbon-carbon bond is located at other than the alpha-position.

17. The drilling system of claim 3 wherein said isomerized olefins consist essentially of a single unsaturated carbon-carbon bond, and have from about 0 to about 2 substituents selected from the group consisting of alkyl groups having from about 1 to about 2 carbon atoms.

18. The drilling system of claim 17 wherein said single unsaturated carbon-carbon bond is located at other than the alpha-position.

19. The drilling system of claim 4 wherein said isomerized olefins consist essentially of a single unsaturated carbon-carbon bond, and have from about 0 to about 2 substituents selected from the group consisting of alkyl groups having from about 1 to about 2 carbon atoms.

20. The drilling system of claim 19 wherein said single unsaturated carbon-carbon bond is located at other than the alpha-position.

21. The drilling system of claim 5 wherein said isomerized olefins consist essentially of a single unsaturated carbon-carbon bond, and have from about 0 to about 2 substituents selected from the group consisting of alkyl groups having from about 1 to about 2 carbon atoms.

22. The drilling system of claim 21 wherein said single unsaturated carbon-carbon bond is located at other than the alpha-position.

23. A method comprising providing a drilling system comprising a continuous phase comprising a blend of olefins, said blend consisting essentially of a first quantity of isomerized olefins having from about 14 to about 16 carbon atoms and a second quantity of linear alpha olefins having about 18 carbon atoms.

24. The method of claim 23 wherein said second quantity is about 20 vol. % or less of said continuous phase.

25. The method of claim 23 wherein said second quantity is about 15 vol. % or less of said continuous phase.

26. The method of claim 23 wherein said first quantity comprises up to about 20 vol. % of said isomerized olefins having about 14 carbon atoms.

27. The method of claim 24 wherein said first quantity comprises up to about 20 vol. % of said isomerized olefins having about 14 carbon atoms.

28. The method of claim 25 wherein said first quantity comprises up to about 20 vol. % of said isomerized olefins having about 14 carbon atoms.

29. The method of claims 23 wherein said blend of olefins comprises a mixture of first isomerized olefins having 14 carbon atoms and second isomerized olefins having 16 carbon atoms.

30. The method of claim 24 wherein said blend of olefins comprises a mixture of first isomerized olefins having 14 carbon atoms and second isomerized olefins having 16 carbon atoms.

31. The method of claim 25 wherein said blend of olefins comprises a mixture of first isomerized olefins having 14 carbon atoms and second isomerized olefins having 16 carbon atoms.

32. The method of claim 26 wherein said blend of olefins comprises a mixture of first isomerized olefins having 14 carbon atoms and second isomerized olefins having 16 carbon atoms.

33. A drilling system adapted to provide for accurate reservoir fluid characterization analysis, said drilling system comprising a continuous phase comprising a blend of olefins said blend consisting essentially of a first quantity of isomerized olefins having from about 14 to about 16 carbon atoms and a second quantity of linear alpha olefins having about 18 carbon atoms.

34. The drilling system of claim 33 wherein said drilling system permits accurate analysis of the presence and quantity of biological markers in said reservoir fluid.

35. The drilling system of claim 33 wherein said second quantity is about 20 volume % or less of said continuous phase.

36. The drilling system of claim 34 wherein said second quantity is about 20 volume % or less of said continuous phase.

37. The drilling system of claim 33 wherein said second quantity is about 15 volume % or less of said continuous phase.

38. The drilling system of claim 34 wherein said second quantity is about 15 volume % or less of said continuous phase.

39. The drilling system of claim 33 wherein said first quantity comprises up to about 20 vol. % of said isomerized olefins having about 14 carbon atoms.

40. The drilling system of claim 34 wherein said first quantity comprises up to about 20 vol. % of said isomerized olefins having about 14 carbon atoms.

41. The drilling system of claim 35 wherein said first quantity comprises up to about 20 vol. % of said isomerized olefins having about 14 carbon atoms.

42. The drilling system of claim 36 wherein said first quantity comprises up to about 20 vol. % of said isomerized olefins having about 14 carbon atoms.

43. The drilling system of claim 37 wherein said first quantity comprises up to about 20 vol. % of said isomerized olefins having about 14 carbon atoms.

44. The drilling system of claim 38 wherein said first quantity comprises up to about 20 vol. % of said isomerized olefins having about 14 carbon atoms.

45. The drilling system of claim 33 wherein said blend of olefins comprises a mixture of first isomerized olefins having 14 carbon atoms and second isomerized olefins having 16 carbon atoms.

46. The drilling system of claim 34 wherein said blend of olefins comprises a mixture of first isomerized olefins having 14 carbon atoms and second isomerized olefins having 16 carbon atoms.

47. The drilling system of claim 35 wherein said blend of olefins comprises a mixture of first isomerized olefins having 14 carbon atoms and second isomerized olefins having 16 carbon atoms.

48. The drilling system of claim 36 wherein said blend of olefins comprises a mixture of first isomerized olefins having 14 carbon atoms and second isomerized olefins having 16 carbon atoms.

49. The drilling system of claim 37 wherein said blend of olefins comprises a mixture of first isomerized olefins having 14 carbon atoms and second isomerized olefins having 16 carbon atoms.

50. The drilling system of claim 38 wherein said blend of olefins comprises a mixture of first isomerized olefins having 14 carbon atoms and second isomerized olefins having 16 carbon atoms.

51. A drilling system adapted to provide for accurate analysis of the presence and quantity of pristane and phytane in reservoir fluids, said drilling system comprising a continuous phase comprising a blend of olefins, said blend consisting essentially of a first quantity of isomerized olefins having from about 14 to about 16 carbon atoms and a second quantity of linear alpha olefins having about 18 carbon atoms.

52. The drilling system of claim 51 wherein said first quantity comprises up to about 20 vol. % of said isomerized olefins having about 14 carbon atoms.

53. The drilling system of claim 51 wherein said second quantity is about 20 volume % or less of said continuous phase.

54. The drilling system of claim 52 wherein said second quantity is about 20 volume % or less of said continuous phase.

55. The drilling system of claim 51 wherein said blend of olefins comprises a mixture of first isomerized olefins having 14 carbon atoms and second isomerized olefins having 16 carbon atoms.

56. The drilling system of claim 52 wherein said blend of olefins comprises a mixture of first isomerized olefins having 14 carbon atoms and second isomerized olefins having 16 carbon atoms.

57. The drilling system of claim 53 wherein said blend of olefins comprises a mixture of first isomerized olefins having 14 carbon atoms and second isomerized olefins having 16 carbon atoms.

58. The drilling system of claim 54 wherein said blend of olefins comprises a mixture of first isomerized olefins having 14 carbon atoms and second isomerized olefins having 16 carbon atoms.

59. A method effective to provide accurate reservoir fluid characterization analysis, said method comprising providing a drilling system comprising a continuous phase comprising a blend of olefins, said blend consisting essentially of a first quantity of isomerized olefins having from about 14 to about 16 carbon atoms and a second quantity of linear alpha olefins having about 18 carbon atoms.

60. The method of claim 59 wherein said method permits accurate analysis of the presence and quantity of biological markers in said reservoir fluid.

61. The method of claim 59 wherein said second quantity is about 20 vol. % or less of said continuous phase.

62. The method of claim 59 wherein said second quantity is about 20 vol. % or less of said continuous phase.

63. The method of claim 60 wherein said second quantity is about 15 vol. % or less of said continuous phase.

64. The method of claim 59 wherein said first quantity comprises up to about 20 vol. % of said isomerized olefins having about 14 carbon atoms.

65. The method of claim 60 wherein said first quantity comprises up to about 20 vol. % of said isomerized olefins having about 14 carbon atoms.

66. The method of claim 61 wherein said first quantity comprises up to about 20 vol. % of said isomerized olefins having about 14 carbon atoms.

67. The method of claim 62 wherein said first quantity comprises up to about 20 vol. % of said isomerized olefins having about 14 carbon atoms.

68. The method of claim 59 wherein said blend of olefins comprises a mixture of first isomerized olefins having 14 carbon atoms and second isomerized olefins having 16 carbon atoms.

69. The method of claim 60 wherein said blend of olefins comprises a mixture of first isomerized olefins having 14 carbon atoms and second isomerized olefins having 16 carbon atoms.

70. The method of claim 61 wherein said blend of olefins comprises a mixture of first isomerized olefins having 14 carbon atoms and second isomerized olefins having 16 carbon atoms.

71. The method of claim 62 wherein said blend of olefins comprises a mixture of first isomerized olefins having 14 carbon atoms and second isomerized olefins having 16 carbon atoms.

72. The method of claim 63 wherein said blend of olefins comprises a mixture of first isomerized olefins having 14 carbon atoms and second isomerized olefins having 16 carbon atoms.

73. The method of claim 64 wherein said blend of olefins comprises a mixture of first isomerized olefins having 14 carbon atoms and second isomerized olefins having 16 carbon atoms.

74. The method of claim 65 wherein said blend of olefins comprises a mixture of first isomerized olefins having 14 carbon atoms and second isomerized olefins having 16 carbon atoms.

75. The method of claim 66 wherein said blend of olefins comprises a mixture of first isomerized olefins having 14 carbon atoms and second isomerized olefins having 16 carbon atoms.

76. The method of claim 67 wherein said blend of olefins comprises a mixture of first isomerized olefins having 14 carbon atoms and second isomerized olefins having 16 carbon atoms.

77. A method for accurate analysis of the presence and quantity of pristane and phytane in reservoir fluids, said method comprising providing a drilling system comprising a continuous phase comprising a blend of olefins, said blend consisting essentially of a first quantity of isomerized olefins having from about 14 to about 16 carbon atoms and a second quantity of linear alpha olefins having about 18 carbon atoms.

78. The method of claim 77 wherein said second quantity is about 20 vol. % or less of said continuous phase.

79. The method of claim 77 wherein said second quantity is about 15 vol. % or less of said continuous phase.

80. The method of claim 77 wherein said first quantity comprises up to about 20 vol. % of said isomerized olefins having about 14 carbon atoms.

81. The method of claim 78 wherein said first quantity comprises up to about 20 vol. % of said isomerized olefins having about 14 carbon atoms.

82. The method of claim 79 wherein said first quantity comprises up to about 20 vol. % of said isomerized olefins having about 14 carbon atoms.

83. The method of claim 77 wherein said blend of olefins comprises a mixture of first isomerized olefins having 14 carbon atoms and second isomerized olefins having 16 carbon atoms.

84. The method of claim 78 wherein said blend of olefins comprises a mixture of first isomerized olefins having 14 carbon atoms and second isomerized olefins having 16 carbon atoms.

85. The method of claim 79 wherein said blend of olefins comprises a mixture of first isomerized olefins having 14 carbon atoms and second isomerized olefins having 16 carbon atoms.

86. The method of claim 80 wherein said blend of olefins comprises a mixture of first isomerized olefins having 14 carbon atoms and second isomerized olefins having 16 carbon atoms.

87. The method of claim 81 wherein said blend of olefins comprises a mixture of first isomerized olefins having 14 carbon atoms and second isomerized olefins having 16 carbon atoms.

88. The method of claim 82 wherein said blend of olefins comprises a mixture of first isomerized olefins having 14 carbon atoms and second isomerized olefins having 16 carbon atoms.

* * * * *